(12) United States Patent
Chae (10) Patent No.: US 12,555,632 B2
(45) Date of Patent: Feb. 17, 2026

(54) HIGH DENSITY EMBEDDED FLASH CELL ARRAY STRUCTURE

(71) Applicant: SEMIBRAIN INC., Seongnam-si (KR)

(72) Inventor: Dong-Hyuk Chae, Seoul (KR)

(73) Assignee: SEMIBRAIN INC., Seongnam-si (KR)

( * ) Notice: Subject to any disclaimer, the term of this patent is extended or adjusted under 35 U.S.C. 154(b) by 83 days.

(21) Appl. No.: 18/439,744

(22) Filed: Feb. 12, 2024

(65) Prior Publication Data

US 2024/0274195 A1 Aug. 15, 2024

(30) Foreign Application Priority Data

Feb. 13, 2023 (KR) .................. 10-2023-0018893

(51) Int. Cl.
| | |
|---|---|
| G11C 16/04 | (2006.01) |
| G11C 5/06 | (2006.01) |
| H10B 41/10 | (2023.01) |
| H10D 30/68 | (2025.01) |

(52) U.S. Cl.
CPC .......... *G11C 16/0483* (2013.01); *G11C 5/063* (2013.01); *H10B 41/10* (2023.02); *H10D 30/689* (2025.01)

(58) Field of Classification Search
CPC . G11C 16/0483; G11C 5/063; G11C 16/0433; H10B 41/10; H10B 41/30; H10B 41/35; H10B 41/41; H10B 41/50; H10B 41/70; H10D 30/689
USPC ..................................................... 365/185.17
See application file for complete search history.

(56) References Cited

U.S. PATENT DOCUMENTS

2019/0311749 A1* 10/2019 Song .................... G11C 5/145

* cited by examiner

*Primary Examiner* — Fernando Hidalgo (57) ABSTRACT

The present invention discloses an embedded flash memory cell array structure characterized by improving integration by reducing the pitch of the cell layout in the row direction by sharing a source or drain with an adjacent control gate transistor.

7 Claims, 12 Drawing Sheets

HIGH DENSITY EMBEDDED FLASH CELL ARRAY STRUCTURE

TECHNICAL FIELD OF THE INVENTION

The present invention relates to an array structure of embedded flash memory cells, and more specifically, to an embedded flash memory cell array structure that can improve integration by sharing the source and drain of transistors.

BACKGROUND OF THE INVENTION

Random Access Memory (RAM) in a computer stores specific information when the power is turned on but has the disadvantage of losing the information stored in binary format when the power is turned off. As a solution to this, a floating gate transistor was programmed that electrons are inserted into the normally electrically isolated parts of the transistor to capture charge when the power is turned off. Afterwards, flash memory appeared, which bundled memory cells together and erased them all at once.

Currently, flash memory is widely used in portable devices with battery such as cell phones, digital cameras, and music players or some devices that suddenly turn off. As the storage capacity of flash memory increases, the price is falling further, and tapes in video cameras and hard disks in laptops are being replaced with lighter and more reliable flash memory. As the performance of these devices improves and their size decreases, the demand for compact, high-performance flash memory is increasing. In this way, with the advancement of modem technology, the importance of technology to improve the integration of flash memory is gradually increasing.

The present invention was developed to solve the above problems, and its purpose is to provide a layout structure that can improve the integration of embedded flash memory cells.

In order to solve the above problems, the present invention discloses an embedded flash memory cell array structure which is characterized in that it improves integration by reducing the pitch of the cell layout in the row direction by sharing the source or drain with adjacent control gate transistors in the embedded flash memory cell array structure.

In one embodiment according to the present invention, an embedded flash memory cell array structure is disclosed that comprises cell a and cell b connected in the row direction, wherein the cells connected in the row direction share a read word line (RWL), a program word line (PWL), a write word line (WWL), and an erase word line (EWL).

In one embodiment according to the present invention, an embedded flash memory cell array structure is disclosed wherein the cell a and cell b include a pair of control gate transistors, a memory cell transistor connected to a floating gate formed by the pair of control gate transistors, and a source selection transistor and a drain selection transistor connected to the memory cell transistor.

In one embodiment according to the present invention, an embedded flash memory cell array structure is disclosed wherein the cell a and cell b share the source or drain region of the control gate transistor.

In one embodiment according to the present invention, an embedded flash memory cell array structure is disclosed wherein the source selection transistor of cell a and the source selection transistor of cell b are arranged at different column direction distances from the control gate transistor.

In one embodiment according to the present invention, an embedded flash memory cell array structure is disclosed wherein the source selection transistor of cell a and the source selection transistor of cell b are arranged such that some areas overlap in the column direction.

In one embodiment according to the present invention, an embedded flash memory cell array structure is disclosed wherein the drain selection transistor of cell a and the drain selection transistor of cell b are arranged at different column direction distances from the control gate transistor.

In one embodiment according to the present invention, an embedded flash memory cell array structure is disclosed wherein the drain selection transistor of cell a and the drain selection transistor of cell b are arranged such that some areas overlap in the column direction.

In one embodiment according to the present invention, an embedded flash memory cell array structure is disclosed wherein the bit line nodes of the drain selection transistors are connected to the bit line nodes of adjacent cells in the column direction.

In one embodiment according to the present invention, an embedded flash memory cell array structure is disclosed wherein the common source line nodes of the source selection transistors are connected to the common source line nodes of adjacent cells in the column direction.

According to the present invention, the cell area can be reduced by reducing the length of the flash memory cell in the row direction by sharing the source and drain of the control gate transistor with the source and drain of the control gate transistor of adjacent columns. Additionally, by arranging the memory cell transistors and selection transistors in a zigzag manner, the memory cell transistors and selection transistors are not connected to adjacent columns even though the control gate transistors share the source and drain, thereby reducing the overall cell area.

DETAILED DESCRIPTION OF THE INVENTION

In the following description, certain embodiments of the present invention will be described in detail with reference to the attached drawings, but identical or similar components will be assigned the same reference numerals regardless of the reference numerals, and duplicate descriptions thereof will be omitted. The suffix "part" for the components used in the following description is given or used interchangeably only considering the ease of preparing the specification, and does not have a distinct meaning or role in itself. Additionally, in describing the embodiments disclosed in this specification, if it is determined that detailed descriptions of related known technologies may obscure the gist of the embodiments disclosed in this specification, the detailed descriptions will be omitted. In addition, it should be noted that the attached drawings are only intended to facilitate understanding of the embodiments disclosed in this specification, and should not be construed as limiting the technical idea disclosed in this specification by the attached drawings.

Terms containing ordinal numbers, such as first, second, etc., may be used to describe various components, but the components are not limited by the terms. The above terms are used only for the purpose of distinguishing one component from another.

When a component is said to be "connected" or "accessed" to another component, it may be directly connected to or accessed to the other component, but it should be understood that other components may exist in between. On the other hand, when it is mentioned that a component is "directly connected" or "directly accessed" to another component, it should be understood that there are no other components in between.

Singular expressions include plural expressions unless the context clearly dictates otherwise.

In this application, it should be understood that terms such as "comprise" or "have" are meant to indicate the presence of features, numbers, steps, operations, components, parts, or combinations thereof described in the specification; however, these terms do not exclude the possibility of the additional features, numbers, steps, operations, components, parts, or combinations thereof existing or being added in advance.

Figure 1:
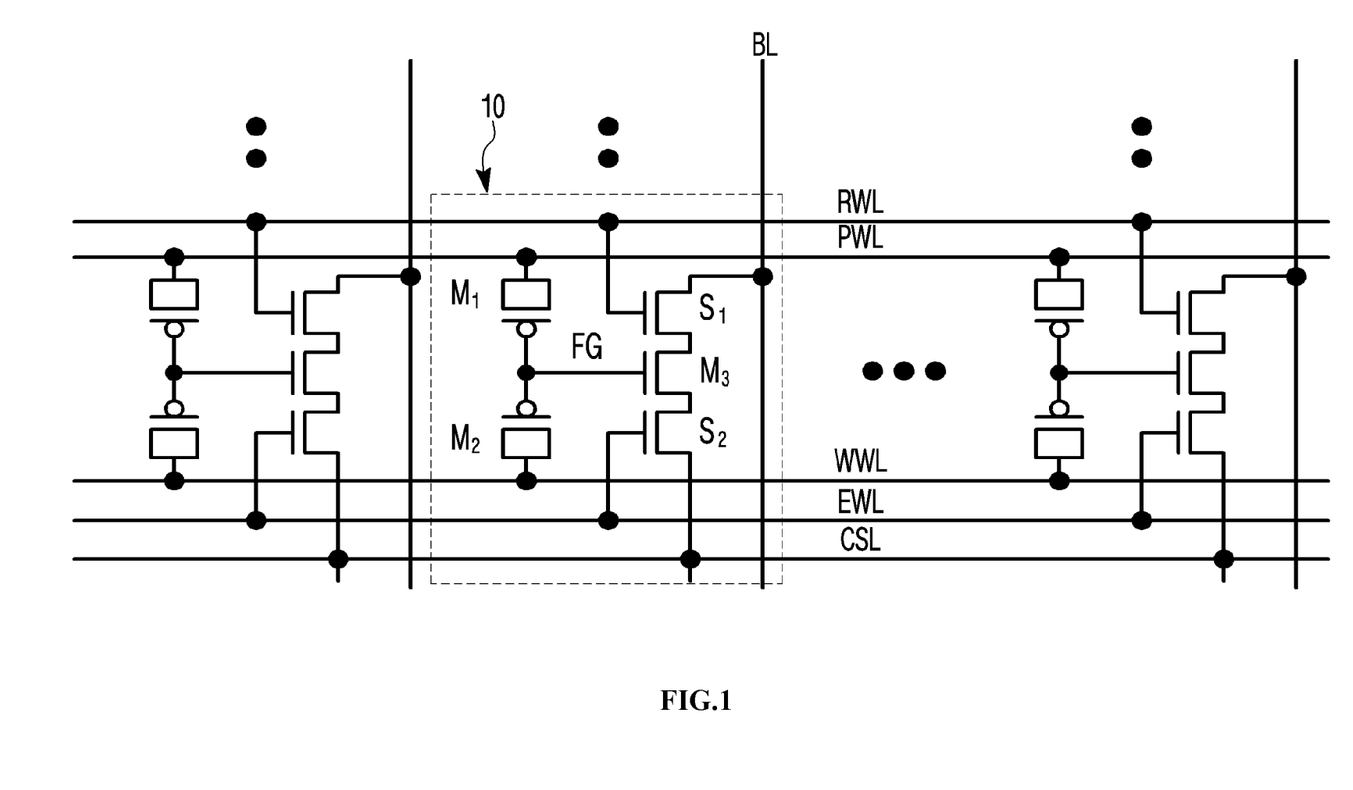
FIG. 1 is a circuit diagram of an embedded flash memory cell array according to one embodiment of the present invention.

FIG. 1 is a circuit diagram of an embedded flash memory cell array according to one embodiment of the present invention. Referring to FIG. 1, the embedded flash memory cell (10) includes a drain selection transistor (S1), a source selection transistor (S2), a pair of control gates, and a memory cell transistor (M3) coupled to the control gate. Cells connected in the row direction share a program word line (PWL), a read word line (RWL), a write word line (WWL), an erase word line (EWL), and a common source line (CSL). However, the cells connected in the row direction are each connected to separate bit lines (BL).

Specifically, the embedded flash memory cell (10) shown in FIG. 1 is connected to the bit line (BL) through the drain selection transistor (S1). The memory cell transistor (M3) in the embedded flash memory cell (10) is connected to a pair of control gate transistors (M1 and M2) forming a floating gate (FG). The first control gate transistor (M1) is connected to the program word line (PWL), and the second control gate transistor (M2) is connected to the write word line (WWL). The embedded flash memory cell (10) can store data in the form of a threshold voltage, which is the lowest voltage that can turn on the cell. The threshold voltage is controlled by the amount of charge held in the floating gate (FG). In other words, before the memory cell transistor (M3) is turned on, a certain level of voltage must be applied to the program word line (PWL) and write word line (WWL) according to the charge level of the floating gate (FG) for current to flow between the selection transistors and conduction between source and drain.

Figure 2:
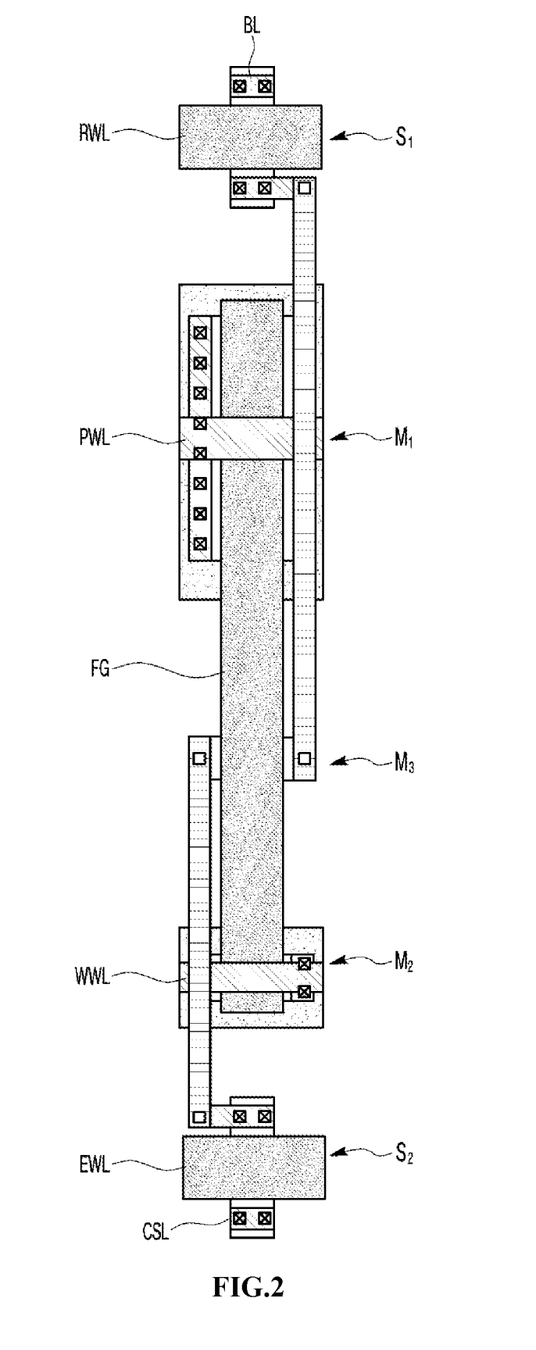
FIG. 2 shows the layout of an embedded flash memory cell.

FIG. 2 shows the layout of an embedded flash memory cell. Referring to FIG. 2, the drain selection transistor (S1) is connected to the bit line (BL) and its gate is connected to the read word line (RWL). The source selection transistor (S2) is connected to the common source line (CSL) and its gate is connected to the erase word line (EWL). The first control gate transistor (M1) is connected to the program word line (PWL), and the second control gate transistor (M2) is connected to the write word line (WWL). The first control gate transistor (M1) and the second control gate transistor (M2) form a floating gate (FG). The floating gate (FG) serves as a data storage node to which control gate transistors and memory cell transistor (M3) are connected. The bit line (BL) allows data to be input during program operation and data output during read operation. The common source line (CSL) can connect the common source to the entire cell array or connect the common source to one or more rows. The program word line (PWL) connects the source, drain, and body of the first control gate transistor (M1), which is a PMOS capacitor element on the N-well, in the row direction. When programming, a high voltage (Vpgm) is applied to the program word line (PWL) so that the floating gate (FG) node voltage rises by coupling and when erasing, 0 V is applied to the program word line (PWL) so that the floating gate (FG) node maintains a low voltage. The write word line (WWL) connects the source, drain, and body of the second control gate transistor (M2), which is a PMOS capacitor element formed on an N-well separate from the program word line (PWL), in the row direction. When programming, Vpgm is applied to the write word line (WWL) like the program word line (PWL), and when erasing, high voltage Vers is applied to allow electrons stored in the floating gate (FG) node to escape. The read word line (RWL) serves to drive the drain selection transistor (S1) and transfers input and output data between the bit line (BL) and the memory cell transistor (M3) during program and read operations. The erase word line (EWL) serves to drive the source selection transistor (S2) that connects the memory cell of the selected row and the common source when reading, and when programming, it serves to disconnect data transmitted through the bit line (BL) from the common source so that it is not affected by the common source.

Figure 3:
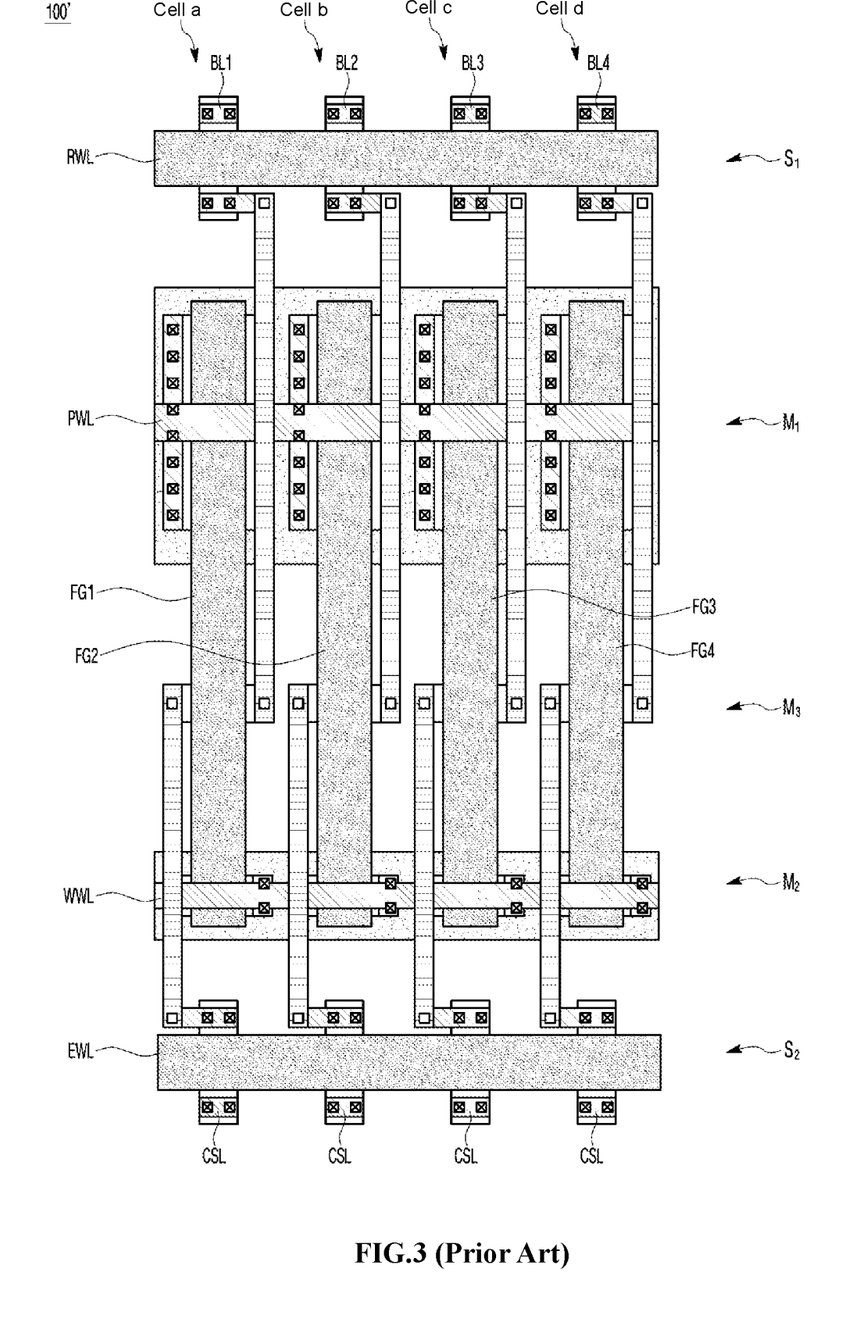
FIG. 3 shows the layout of an embedded flash memory cell array in which a plurality of embedded flash memory cells are connected.
Figure 4A:
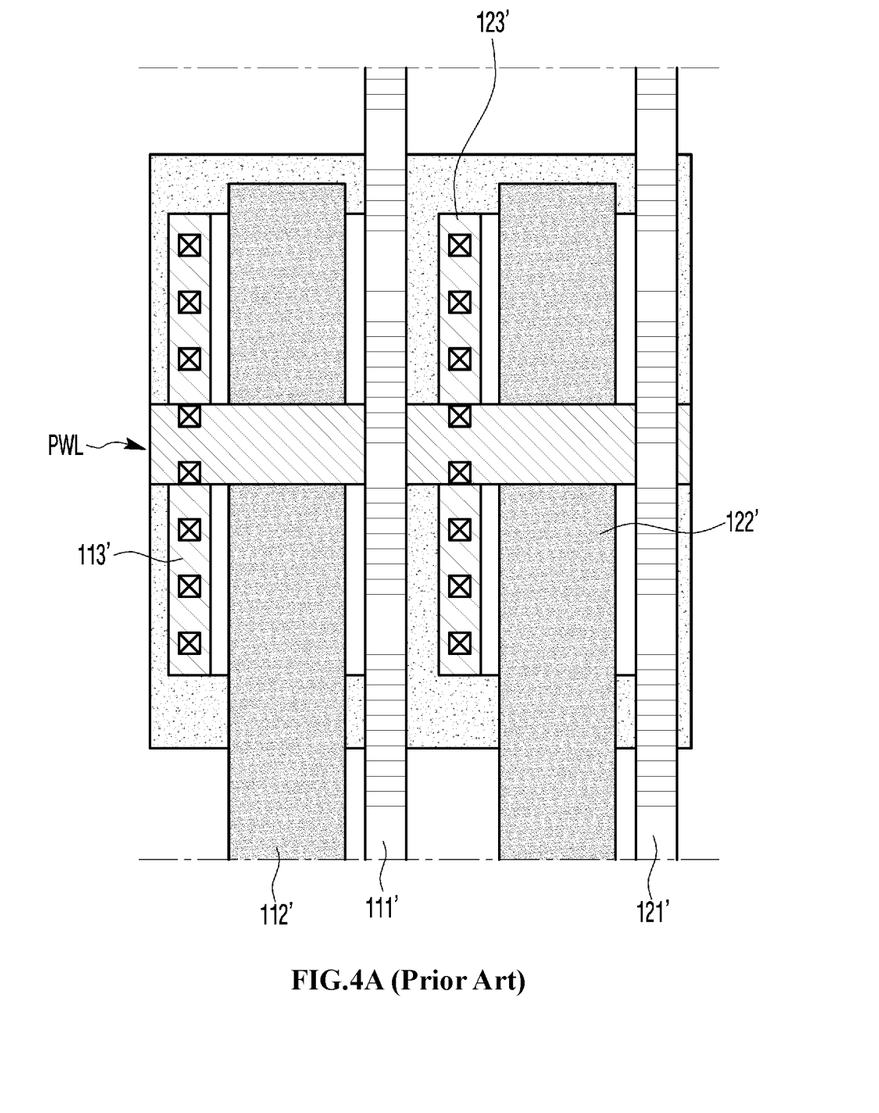
FIG. 4A is an enlarged view of the control gate transistor M1 of FIG. 3.
Figure 4B:
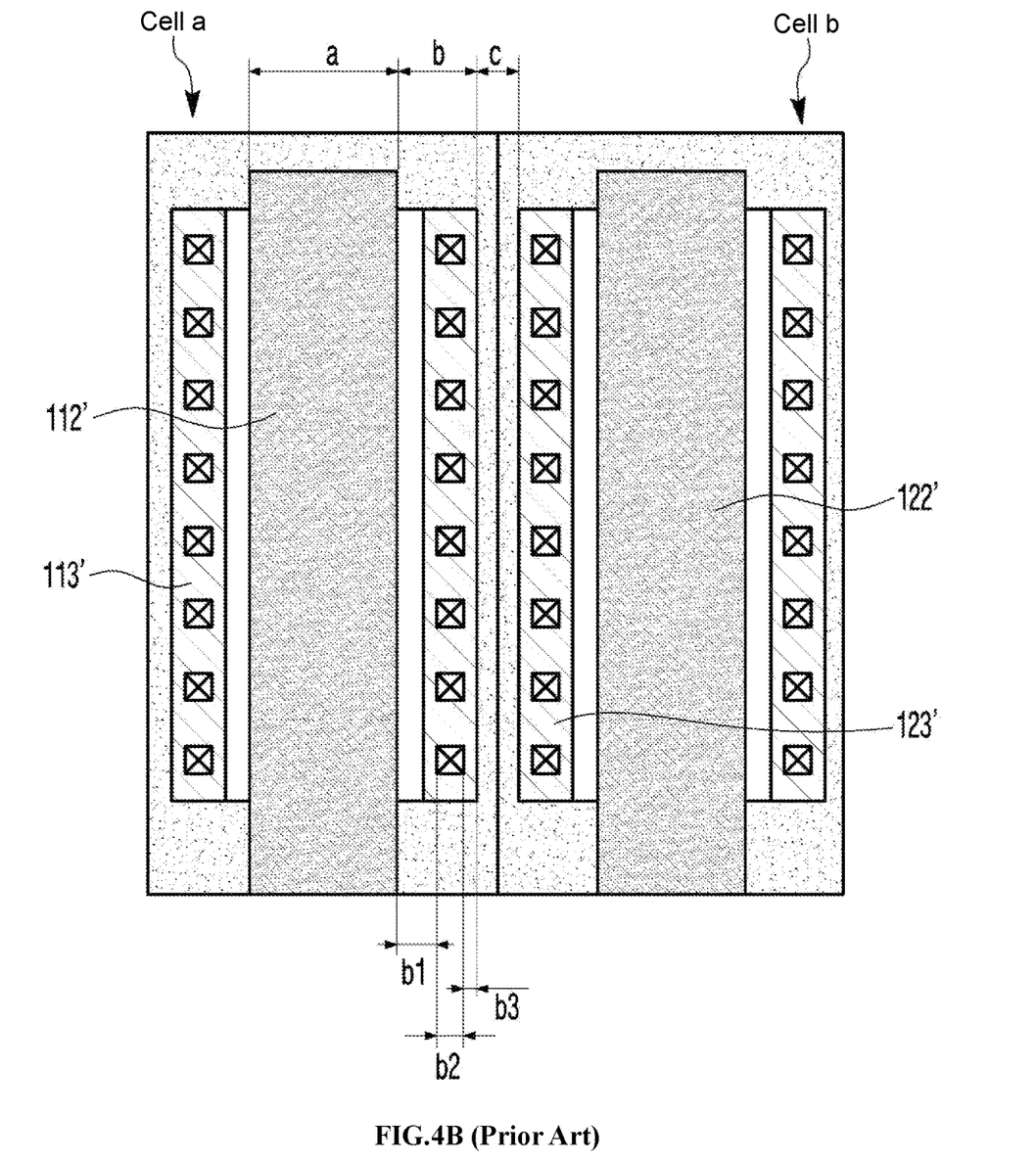
FIG. 4B is a diagram for explaining the arrangement spacing of the control gate transistor M1 in FIG. 3.

FIG. 3 shows the layout of the embedded flash memory cell array (100') in which a plurality of embedded flash memory cells are connected, FIG. 4A is an enlarged view of the control gate transistor (M1) in FIG. 3 and FIG. 4B is a diagram for explaining the arrangement spacing of the control gate transistor (M1) in FIG. 3.

As shown in FIG. 3, cell a to cell d are connected to each other in the row direction. For convenience, from left to right, they are named cell a, cell b, cell c, and cell d. The cell array is arranged in such a way that cell a to cell d are simply arranged in a row direction as shown. Cell a through d share a read word line (RWL), program word line (PWL), write word line (WWL), erase word line (EWL), and common source line (CSL), but the cells are each connected to a separate bit line (BL) (BL1, BL2, BL3, BL4). The cells connected in the column direction (not shown) may share the bit line (BL) and common source line (CSL), but the read word line (RWL), program word line (PWL), write word line (WWL), and erase word line (EWL) is not shared.

Referring to FIG. 4A, the first control gate transistor (M1) of cell a includes a floating gate (112'), a program word line (PWL), and a source (or drain) (113'). As shown, there is a source (or drain) (113') on the left and a source (or drain) (not shown) on the right with the floating gate (FG, 112') in between. The source (or drain) on the right is placed in a layer below a wire (111') and is not shown in the drawing. The first control gate transistor (M1) of cell b includes a floating gate (FG, 122'), a program word line (PWL), and a source (or drain) (123'). There is a left source (or drain) (123') and a right source (or drain) (not shown) with the floating gate (FG, 122') in between. The source (or drain) on the right is placed in a layer below a wire (121') and is not shown in the drawing.

Referring to FIG. 4B, one cell is composed of a gate region length a, two source or drain region lengths b, and an isolation region length c in the row direction. That is, the cell pitch in the row direction is a+2*b+c. The length b of the source or drain region is specifically composed of a gap b1 between the gate and the via, a via size b2, and a gap b3 between the via and the isolation. In the present invention, the connection structure of the control gate transistor was changed to reduce the gap between cells, and the wire connection structure of the selection transistors and the memory cell transistor (M3) was changed to solve problems that may occur due to a reduced gap between cells.

Below, with reference to FIGS. 5 to 10, a changed layout will be presented and a detailed explanation will be given of how the structure of each transistor changes.

Figure 5:
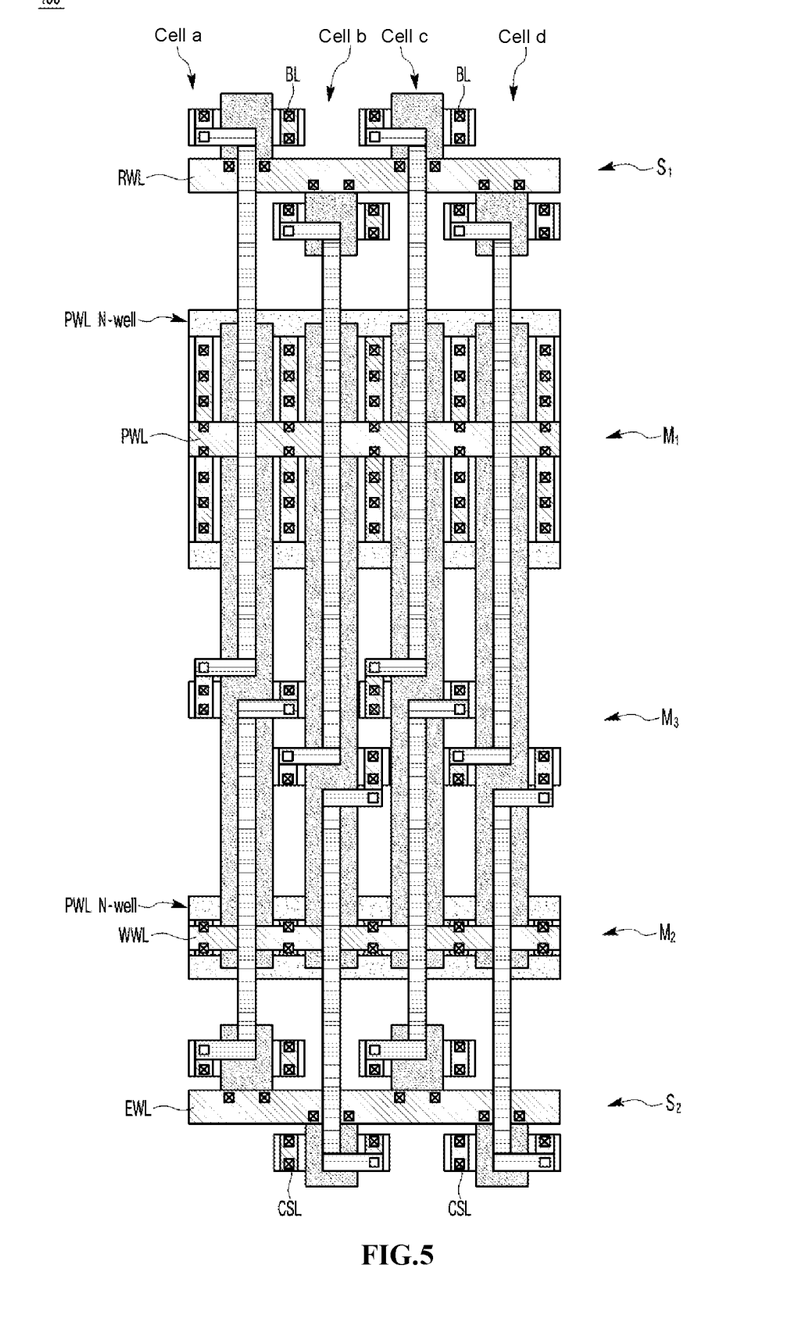
FIG. 5 shows the layout of an embedded flash memory cell array connecting a plurality of embedded flash memory cells according to one embodiment of the present invention.

FIG. 5 shows the layout of an embedded flash memory cell array (100) in which a plurality of embedded flash memory cells are connected according to an embodiment of the present invention. Referring to FIG. 5, the embedded flash memory cell array (100) according to the present invention can reduce the row direction length by sharing the source or drain with the control gate transistor of another adjacent cell. In addition, the drain selection transistors (S1) of adjacent cells share a read word line (RWL) extending in the row direction, and the drain selection transistor of cell a and the drain selection transistor of cell b are arranged that each transistor has different column direction distance from each control gate transistor, and the drain selection transistor of cell a and the drain selection transistor of cell b may be arranged such that some areas overlap in the column direction.

For example, as shown, the drain selection transistor (S1) of cell a is disposed above the read word line (RWL) in the column direction, and the drain selection transistor (S1) of cell b is disposed below the read word line (RWL) in the column direction. According to this structure, since it is the same effect as overlapping some areas compared to when the cells are arranged in the row direction without overlapping, so it is possible to improve cell integration even without reducing the size of the drain select transistor (S1).

Similarly, the source selection transistors (S2) of adjacent cells share an erase word line (EWL) extending in the row direction, and the source selection transistor of cell a and the source selection transistor of cell b are arranged that each transistor has different column direction distance from each control gate transistor, and the source selection transistor of cell a and the source selection transistor of cell b may be arranged such that some areas overlap in the column direction.

For example, as shown, the source selection transistor (S2) of cell a is disposed above the erase word line (EWL) in the column direction, and the source selection transistor (S2) of cell b is disposed below the erase word line (EWL) in the column direction. One side of the memory cell transistor (M3) is connected to the drain selection transistor (S1) and the other side is connected to the source selection transistor (S2).

Figure 6A:
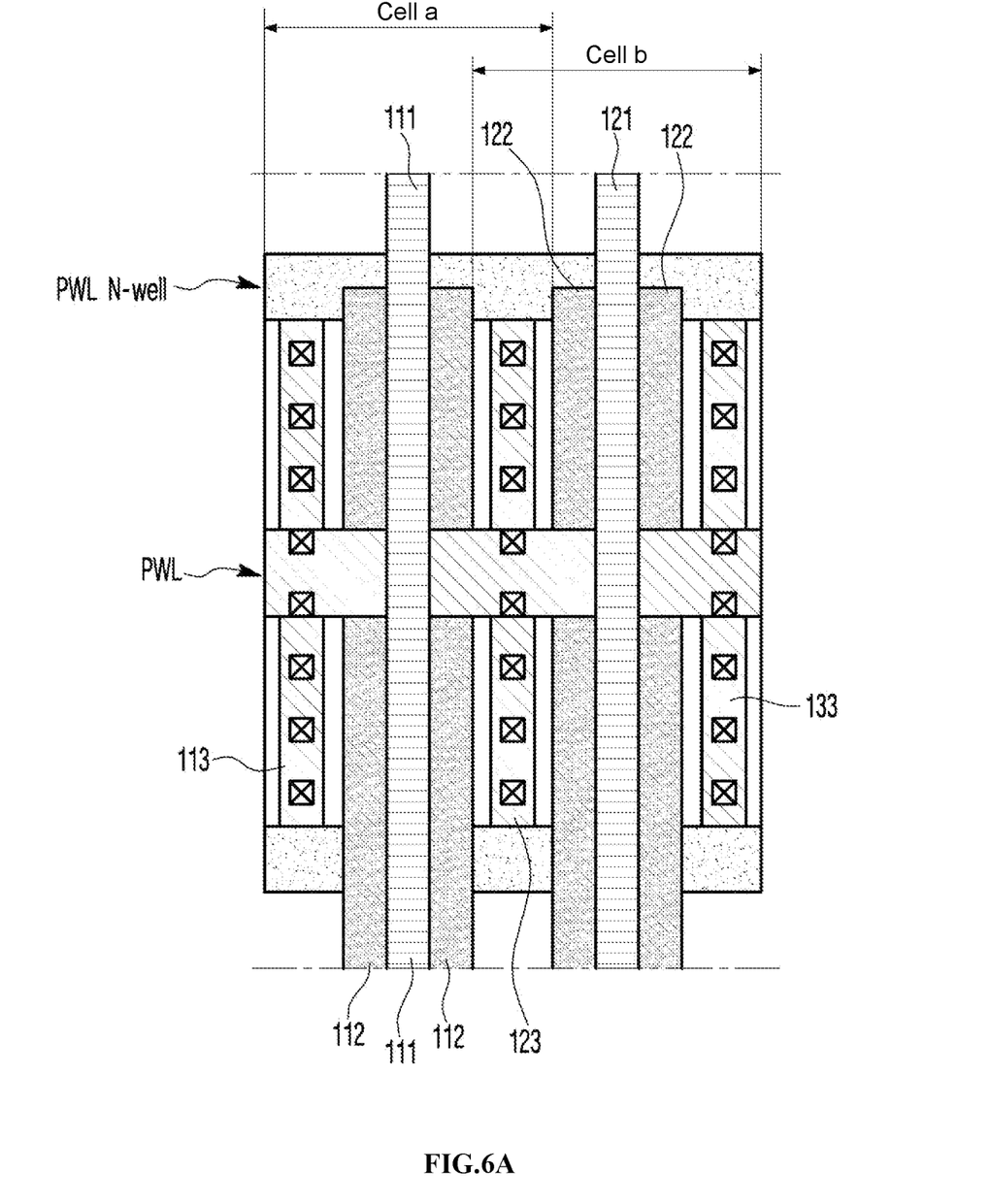
FIG. 6A is an enlarged view of the control gate transistor M1 of FIG. 5.
Figure 6B:
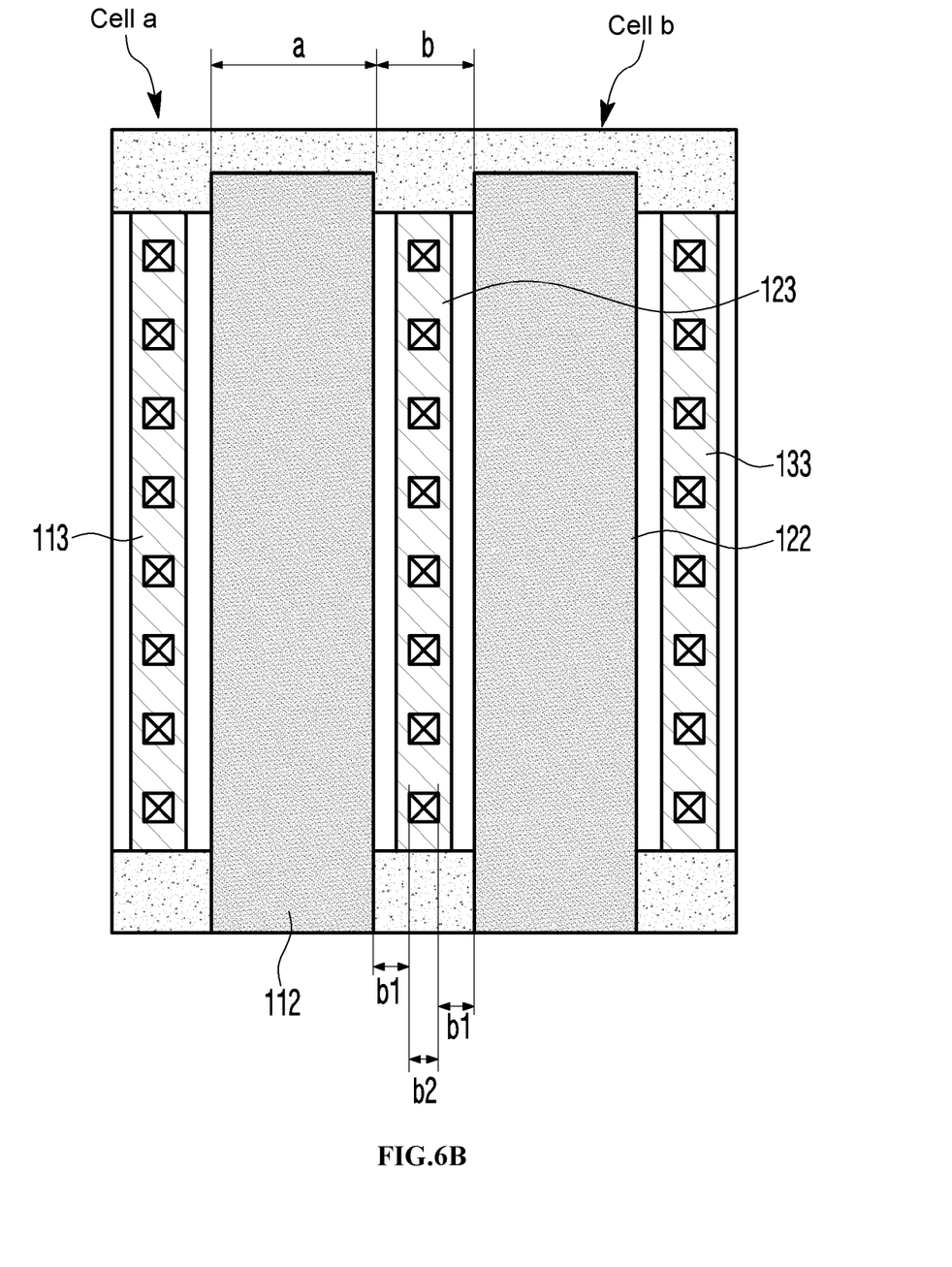
FIG. 6B is a diagram for explaining the arrangement spacing of the control gate transistor M1 in FIG. 5.
Figure 7:
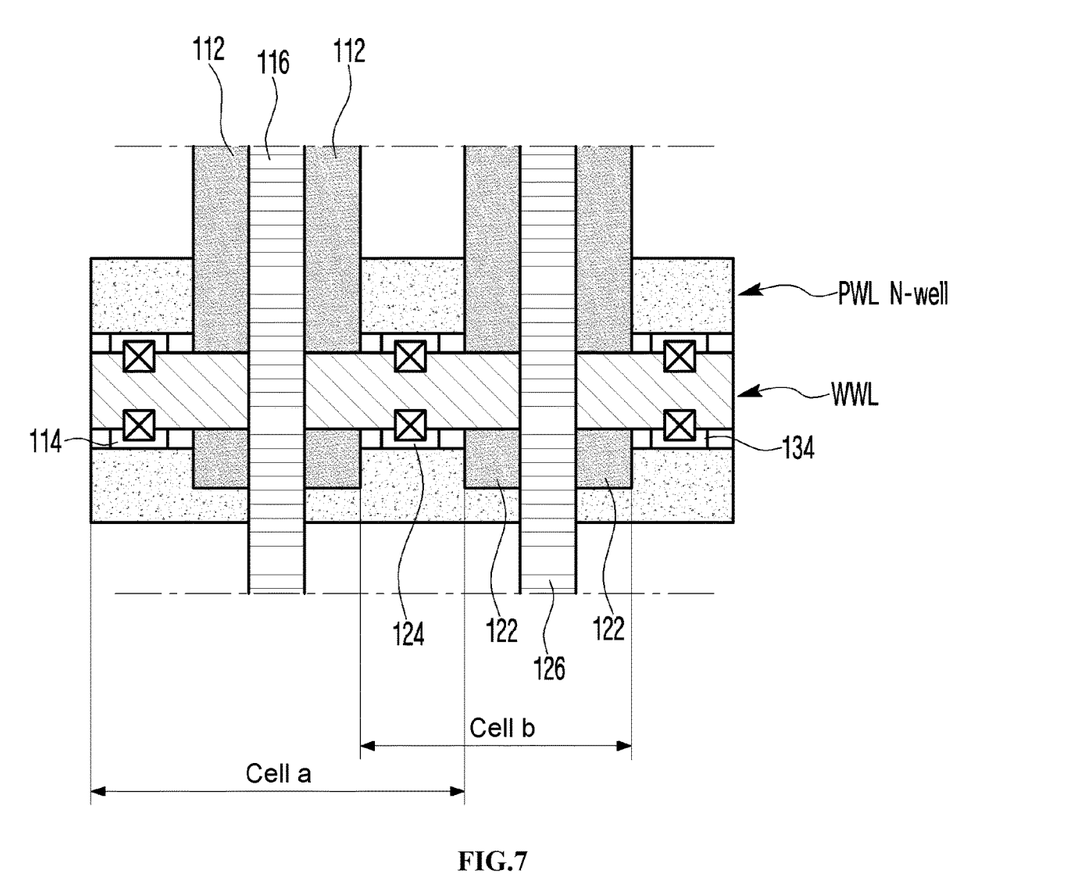
FIG. 7 is an enlarged view of the control gate transistor M2 of FIG. 5.

FIG. 6A is an enlarged view of the first control gate transistor (M1) in FIG. 5, FIG. 6B is a diagram for explaining the arrangement spacing of the control gate transistor (M1) in FIG. 5, and FIG. 7 is an enlarged view of the second control gate transistor (M2) of FIG. 5.

Referring to FIGS. 6A and 6B, the first control gate transistor (M1) of cell a shares a source or drain with the first control gate transistor (M1) of the adjacent cell b. According to this, it can be seen that the cell pitch, which was a+2*b+c in FIG. 4B, is reduced by b+c in FIG. 6B to become a+b. In FIG. 6B, the length b of the source or drain region is specifically composed of the distance b1 between the gate and the contact and the contact size b2.

The first control gate transistor (M1) of cell a includes a floating gate (112), a program word line (PWL), and sources (or drains) (113 and 123). As shown, there is a source (or drain) (113) on the left and a source (or drain) (123) on the right with the floating gate (FG, 112) in between. The right source (or drain) (123) becomes the left source (or drain) of cell b.

The first control gate transistor (M1) of cell b includes a floating gate (FG, 122), a program word line (PWL), and sources (or drains) (123 and 133). There is a source (or drain) (123) on the left and a source (or drain) (133) on the right with the floating gate (FG, 122) in between. At this time, the right source (or drain) (133) becomes the left source (or drain) of cell c. In this way, cells connected in the row direction share one source (or drain). According to this layout, the width of the cell can be reduced by an amount corresponding to b+c in the area shown in FIG. 4b.

Referring to FIG. 7, the second control gate transistor (M2) of cell a shares a source or drain with the second control gate transistor (M2) of the adjacent cell b. The second control gate transistor (M2) of cell a includes a floating gate (112), a write word line (WWL), and a source (or drain) (114 and 124). As shown, there is a source (or drain) (114) on the left and a source (or drain) (124) on the right with the floating gate (FG, 112) in between. The right source (or drain) (124) becomes the left source (or drain) of cell b.

The second control gate transistor (M2) of cell b includes a floating gate (FG, 122), a write word line (WWL), and sources (or drains) (124 and 134). There is a source (or drain) (124) on the left and a source (or drain) (134) on the right with the floating gate (FG, 122) in between. At this time, the right source (or drain) (134) becomes the left source (or drain) of cell c.

Figure 8:
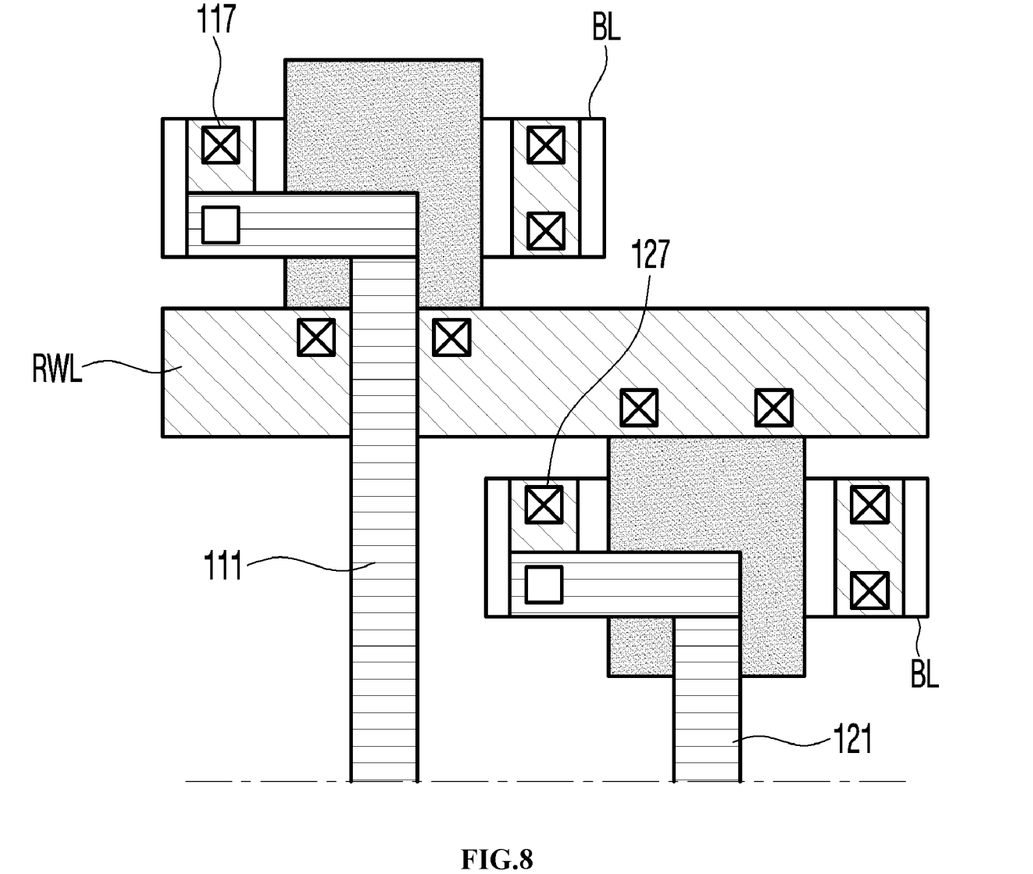
FIG. 8 is an enlarged view of the drain selection transistor S1 in FIG. 5.

FIG. 8 is an enlarged view of the drain selection transistor (S1) in FIG. 5. Referring to FIG. 8, one end of the drain selection transistor (S1) of cell a is connected to the memory cell transistor (M3) through a wire (111), and the other end is connected to the bit line (BL). The gate of the drain selection transistor (S1) is connected to the read word line (RWL). One end of the drain selection transistor (S1) of cell b is connected to the memory cell transistor (M3) through a wire (121), and the other end is connected to the bit line (BL). The drain selection transistor (S1) of cell a and the drain selection transistor (S1) of cell b do not share the bit line (BL) but are each connected to independent bit lines (BL). The drain selection transistor (S1) of cell a and the drain selection transistor (S1) of cell b share the read word line (RWL).

For example, according to one embodiment of the present invention, the read word line (RWL) extends long in the row direction as shown in FIG. 8. The gate of the drain selection transistor (S1) of cell a is placed above the read word line (RWL) in the column direction, and the gate of the drain selection transistor (S1) of cell b is placed below the read word line (RWL) in the column direction.

Figure 9:
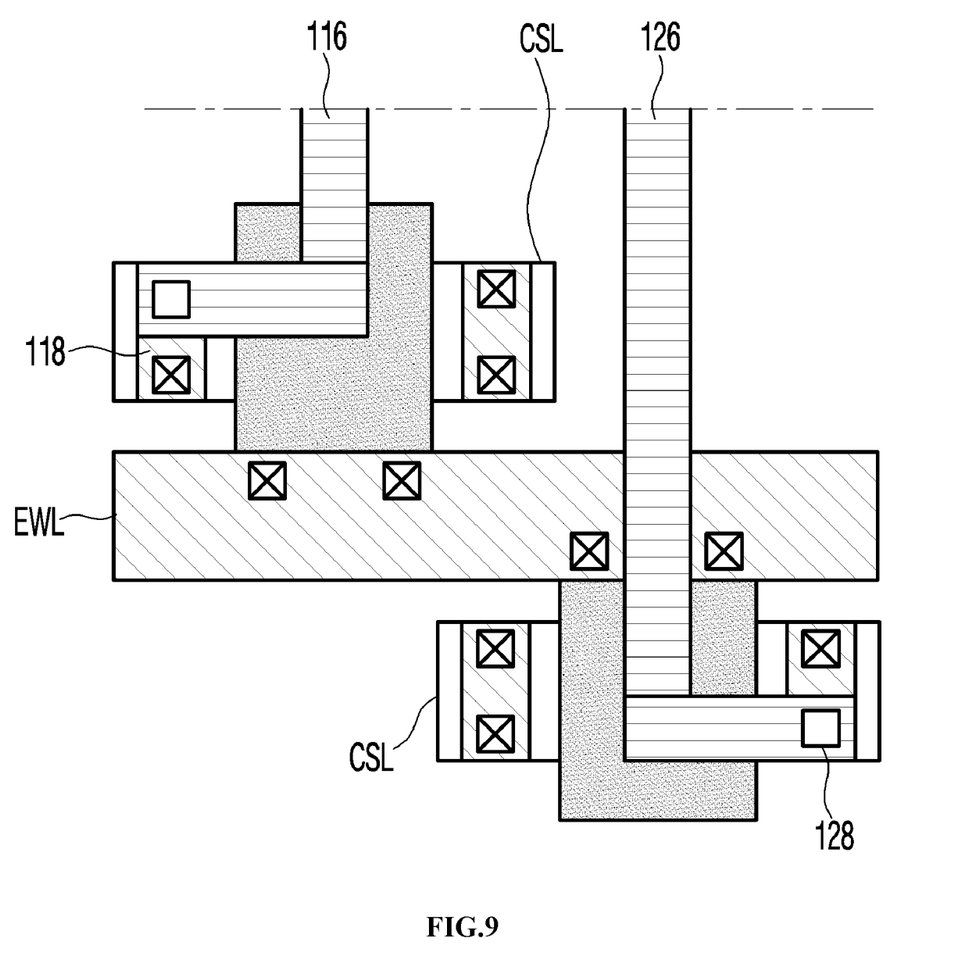
FIG. 9 is an enlarged view of the source selection transistor S2 in FIG. 5.

FIG. 9 is an enlarged view of the source selection transistor (S2) in FIG. 5. Referring to FIG. 9, one end of the source selection transistor (S2) of cell a is connected to the memory cell transistor (M3) through a wire (116), and the other end is connected to the common source line (CSL). The gate of the source selection transistor (S2) is connected to the erase word line (EWL). One end of the source selection transistor (S2) of cell b is connected to the memory cell transistor (M3) through a wire (126), and the other end is connected to the common source line (CSL).

According to one embodiment of the present invention, the erase word line (EWL) extends long in the row direction as shown in FIG. 9. The gate of the source selection transistor (S2) of cell a is placed above the erase word line (EWL) in the column direction, and the gate of the source selection transistor (S2) of cell b is placed below the erase word line (EWL) in the column direction.

Figure 10:
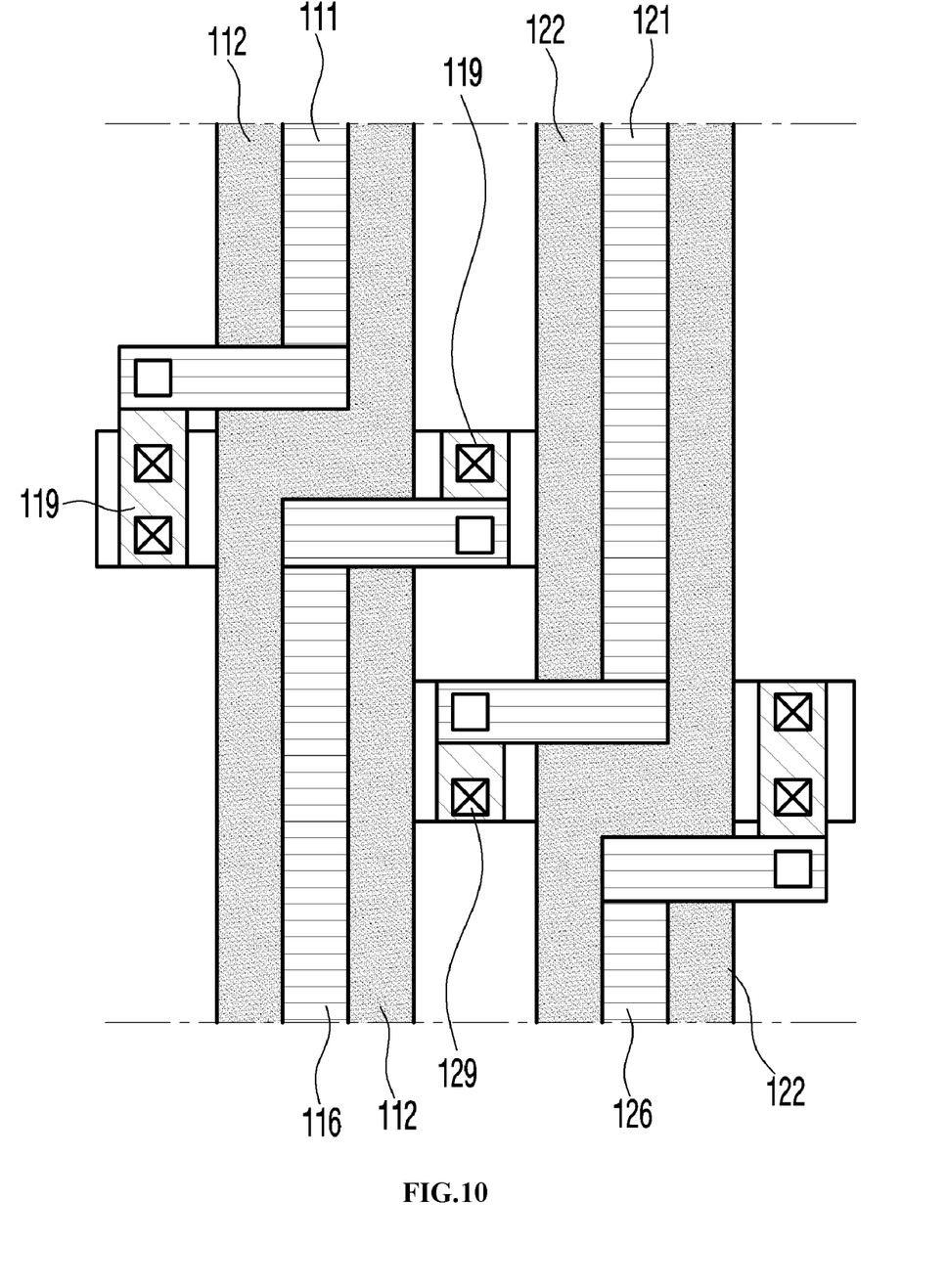
FIG. 10 is an enlarged view of the memory cell transistor M3 in FIG. 5.

FIG. 10 is an enlarged view of the memory cell transistor (M3) in FIG. 5. Referring to FIG. 10, one end of the memory cell transistor (M3) of cell a is connected to the drain selection transistor (S1) through the wire (111), and the other end is connected to the source selection transistor (S2) through the wire (116). One end of the memory cell transistor (M3) of cell b is connected to the drain selection transistor (S1) through the wire (121), and the other end is connected to the source selection transistor (S2) through the wire (126). A portion (right side) of the memory cell transistor M3 of cell a is arranged to be spaced apart from a portion (left side) of the memory cell transistor M3 of cell b in the column direction, thereby reducing the row length of the cell.

Since the memory cell transistor (M3) and the selection transistors must be separated from the corresponding transistors in adjacent columns, in one embodiment of the present invention, the memory cell transistor (M3) and the selection transistors may be arranged in a zigzag shape as described above. When arranged in this way, the cell pitch (WL pitch) in the column direction increases somewhat, but the overall cell area decreases. According to the combination of arrangements of the control gate transistors, memory cell transistor, and selection transistors described above, it can be seen that the area is reduced by about 30 to 40% compared to the conventional cell array.

In at least one embodiment of the present invention described above, through the proposed invention, the overall cell area can be reduced by reducing the length of the flash memory cells in the row direction by sharing the source and drain of the control gate transistor with the control gate transistors of adjacent columns, and the memory cell transistors and selection transistors are not connected to the corresponding transistors in adjacent columns by arranging the memory cell transistors and selection transistors in a zigzag manner even though the control gate transistors share the source and drain, improved effects can be expected compared to the prior art.

The embedded flash memory cell array structure described above is not limited to the configuration and method of the embodiments described above. The above embodiments may be configured by selectively combining all or part of each embodiment so that various modifications can be made.

Explanation of Reference Signs

| | |
|---|---|
| 100: Embedded Flash memory Cell Array | 100': Embedded Flash memory Cell Array |
| 110: Cell a | 111: Wire |
| 112: Floating Gate | 113: Source (or Drain) of the Control Gate Transistor |
| 114: Source (or Drain) of the Control Gate Transistor | 116: Wire |
| 117: Drain Selection Transistor | 118: Source Selection Transistor |
| 119: Memory Cell Transistor | 120: Cell b |
| 121: Wire | 122: Floating Gate |
| 123: Source (or Drain) of the Control Gate Transistor | |
| 124: Source (or Drain) of the Control Gate Transistor | |
| 126: Wire | 127: Drain Selection Transistor |
| 128: Source Selection Transistor | 129: Memory Cell Transistor |
| M1: The First Control Gate Transistor | M2: The Second Control Gate Transistor |
| M3: Memory Cell Transistor | S1: Drain Selection Transistor |
| S2: Source Selection Transistor | BL: Bit Line |
| RWL: Read Word Line | PWL: Program Word Line |
| FG: Floating Gate | WWL: Write Word Line |
| EWL: Erase Word Line | CSL: Common Source Line |

What is claimed is:

1. An embedded flash memory cell array comprising a plurality of memory cells arranged in the flash memory cell array,
wherein a first memory cell includes a first pair of transistors, each of said transistor having a source or drain region that is shared with a second pair of transistors in a second memory cell that is adjacent to the first memory cell, thereby reducing a pitch of the memory cell array in a row direction and improving an integration of the flash memory cell array;
wherein the memory cells connected in the row direction comprise a memory cell a and a memory cell b that share a read word line (RWL), a program word line (PWL), a write word line (WWL), and an erase word line (EWL), wherein each memory cell comprises a pair of control gate transistors, a memory cell transistor connected to a floating gate formed by the pair of control gate transistors, and a source selection transistor and a drain selection transistor that are connected to the memory cell transistor, wherein the source selection transistor of the memory cell a and the source selection transistor of the memory cell b are arranged to overlap each other in a zigzag pattern and spaced apart by a predefined distance.

2. The embedded flash memory cell array of claim 1, wherein the pair of control gate transistors comprises a first control gate transistor (M1) and a second control gate transistor (M2) wherein the first control gate transistor (M1) of the memory cell a share the source or drain region with the first control gate transistor (M1) of the memory cell b, and the second control gate transistor (M2) in the memory cell a share the source or drain region with the second control gate transistor (M2) in the memory cell b.

3. The embedded flash memory cell array of claim 2, wherein the source selection transistor of the memory cell a and the source selection transistor of the memory cell b are arranged at different column direction distances from the pair of control gate transistors.

4. The embedded flash memory cell array of claim 3, wherein the drain selection transistor of the memory cell a and the drain selection transistor of the memory cell b are arranged at different column direction distances from the pair of control gate transistors.

5. The embedded flash memory cell array of claim 4, wherein the drain selection transistor of the memory cell a and the drain selection transistor of the memory cell b are arranged to overlap each other in a zigzag pattern and spaced apart by a predefined distance.

6. The embedded flash memory cell array of claim 5, wherein a bit line nodes of each of the drain selection transistors is connected to one or more bit line nodes of one or more adjacent cells in a corresponding column direction.

7. The embedded flash memory cell array structure of claim 5, wherein a common source line node of each of the source selection transistors is connected to common source line nodes of one or more adjacent cells in a corresponding column direction.

* * * * *